(12) United States Patent
Rempe et al.

(10) Patent No.: US 12,446,499 B2
(45) Date of Patent: *Oct. 21, 2025

(54) PATH-BASED WATER CAPACITY DETERMINATION FOR ANCILLARY SPANS

(71) Applicant: Reinke Manufacturing Company, Inc., Deshler, NE (US)

(72) Inventors: Ty Dane Rempe, Superior, NE (US); Josiah John Carey, Deshler, NE (US)

(73) Assignee: Reinke Manufacturing Co., Inc., Deshler, NE (US)

( * ) Notice: Subject to any disclaimer, the term of this patent is extended or adjusted under 35 U.S.C. 154(b) by 264 days.

This patent is subject to a terminal disclaimer.

(21) Appl. No.: 18/094,677

(22) Filed: Jan. 9, 2023

(65) Prior Publication Data

US 2023/0157226 A1    May 25, 2023

Related U.S. Application Data

(63) Continuation of application No. 16/376,343, filed on Apr. 5, 2019, now Pat. No. 11,547,067.

(51) Int. Cl.
| | |
|---|---|
| *A01G 25/16* | (2006.01) |
| *A01G 25/09* | (2006.01) |
| *G01B 21/28* | (2006.01) |
| *G01C 21/00* | (2006.01) |

(52) U.S. Cl.
CPC .......... *A01G 25/16* (2013.01); *A01G 25/092* (2013.01); *G01B 21/28* (2013.01); *G01C 21/00* (2013.01)

(58) Field of Classification Search
CPC ...... A01G 25/16; A01G 25/092; G01B 21/28; G01C 21/00; G01C 21/20
See application file for complete search history.

(56) References Cited

U.S. PATENT DOCUMENTS

| | | | |
|---|---|---|---|
| 3,979,062 A | 9/1976 | Christensen et al. | |
| 4,508,269 A | 4/1985 | Davis et al. | |
| 6,007,004 A * | 12/1999 | Unruh | A01G 25/092 239/731 |
| 6,045,066 A | 4/2000 | Gerdes et al. | |
| 6,666,384 B2 | 12/2003 | Prandi | |
| 6,938,842 B2 * | 9/2005 | Choat | A01G 25/092 239/728 |
| 10,299,445 B2 * | 5/2019 | Whalley | B05B 1/20 |
| 2004/0232261 A1 | 11/2004 | Choat et al. | |
| 2017/0156273 A1 * | 6/2017 | Whalley | B05B 1/20 |
| 2018/0169684 A1 | 6/2018 | Zhu | |

* cited by examiner

*Primary Examiner* — Zhipeng Wang
(74) *Attorney, Agent, or Firm* — Shook, Hardy & Bacon L.L.P.

(57) ABSTRACT

Systems and methods for determining optimal water capacity or distribution for each of a plurality of sections of a field to be irrigated by an ancillary span of an irrigation system are provided. A path is determined for a steering tower of the ancillary span that is comprised of a plurality of position-based coordinates. The position of the ancillary span steering tower (and thus the position of the ancillary span) relative to the determined path is always known and, accordingly, the optimal water capacity or distribution for the needs of its location can be readily determined based upon a calculated area factor percentage.

6 Claims, 7 Drawing Sheets

| Coordinate | | |
|---|---|---|
| Zone 11 Area Factor | Area in sq. ft | Area Factor Percentage |
| Section 48 (Prime Section) | 24,000 | 100% |
| Section 49 | 23,980 | 99.9% |
| Section 50 | 22,001 | 91.7% |
| Section 110 | 10,852 | 45.2% |

FIG. 9.

PATH-BASED WATER CAPACITY DETERMINATION FOR ANCILLARY SPANS

CROSS REFERENCE TO RELATED APPLICATIONS

This application is a continuation of U.S. non-Provisional application Ser. No. 16/376,343, filed Apr. 5, 2019, and titled "Path-Based Water Capacity Determination for Ancillary Spans" which is hereby incorporated by reference in its entirety.

TECHNICAL FIELD

The present disclosure generally relates to irrigation equipment and, more particularly, to center pivot irrigation systems which are provided with an ancillary span (i.e., swing arm), wrap span, or the like attachment for irrigating corner areas of fields. The present disclosure further relates to systems and methods for optimizing the distribution of water from ancillary spans, wrap spans, or the like in center pivot irrigation systems.

BACKGROUND

The following discussion of the background of the disclosure is intended to facilitate an understanding of the present disclosure. However, it should be appreciated that the discussion is not an acknowledgement or admission that any of the referenced material was published, known, or part of the common general knowledge as of the priority date of the application. Some embodiments of the disclosure are described herein with reference to irrigation equipment, machines and/or systems. However, it will be understood and appreciated by those having ordinary skill in the art that embodiments of the disclosure are not limited to irrigation system applications and may be used in other applications where optimizing liquid distribution within a bounded area would be beneficial.

Mechanized irrigation systems provide the ability to manage water resources and, in some instances, other liquids. For example, mechanized irrigation systems can enable application of an optimal amount of water at critical times during a crop's life cycle, fortifying crop health and maximizing yield potential. While there are many components that make up mechanized irrigation systems, in a general sense, such systems include a mechanical structure, a drivetrain, and a control system. One common type of mechanized irrigation system is a center pivot arrangement that includes a central pivot point about which the system rotates, swivels, or revolves. The central pivot point generally includes a rotational swivel and bearing assembly that supports a substantially horizontal, primary, irrigation pipeline having one or more spans. A "span," as the term is used herein, is a structural assembly comprised of at least a portion of the substantially horizontal, primary, irrigation pipeline, struts and braces, and a truss rod connection system. A span travels in a fixed circular operation in relation to the central pivot point. The path of travel is determined by the span's radial position with respect to the central pivot point. Hence, the particular area capable of being irrigated by a span can be ascertained through standard mathematical calculations known to those having ordinary skill in the art. This, in turn, permits optimal water capacity or distribution to be determined.

Although central-pivot-type irrigation systems function satisfactorily for the most part, they are capable of watering only circular areas. Most plots of land, however, are not circular in shape, but are of some other shape, the most common of which is rectangular. A basic central pivot machine is not able to irrigate the corner areas of rectangular fields or other areas outside of the circle covered by the machine. Accordingly, various types of attachments have been proposed to more adequately cover the sizeable land area represented by field corners. One successful type of corner irrigation system incorporates an ancillary span or swing arm which is added onto an outermost end of a primary irrigation pipeline. (It will be understood throughout this patent that reference to the term "ancillary span" is intended to incorporate not only ancillary spans but wrap spans and the like as well.)

An ancillary span is generally similar in construction to the spans of the primary irrigation pipeline, except that it has a hinge connection with the outermost end (relative to the central pivot point) of the primary irrigation pipeline and is supported by a tower having steerable wheels (i.e., a steering tower or S-tower). As the primary irrigation pipeline turns about the central pivot point, the steering tower is able to pivot the ancillary span out into the corners of the field and to retract the ancillary span back behind (or in front) of the primary irrigation pipeline as the system departs from a corner. In this manner, the ancillary span provides controllable and moveable extension to the primary irrigation pipeline which is able to cover a substantial portion of each corner of the field.

Determining optimal water capacity for irrigation systems incorporating ancillary spans is much more complex than performing the standard mathematical calculations for determining optimal water capacity for a circular area covered by a primary irrigation pipeline. This is due in part to the ability of the ancillary span to maneuver at different extension and retraction velocities independent of the primary irrigation pipeline. Thus, many prior-proposed and/or existing irrigation systems incorporating an ancillary span fail to apply water in a uniform manner to the corners of the field. As the ancillary span extends out into a field corner, it travels faster than the primary irrigation pipeline; thus, under-watering can occur in the area covered by the ancillary span during its extension. Conversely, the ancillary span moves relatively slowly as it retracts out of the field corners; thus, over-watering can occur in the areas covered by the ancillary span as it folds back behind the primary irrigation pipeline. The overall result is that some areas near the field corners may be under-watered and other areas may be over-watered, and the effectiveness of the irrigation suffers accordingly.

Another issue that makes determining optimal water capacity for ancillary spans more complex when compared to a primary irrigation pipeline is that the orientation of the ancillary span as it passes over the area to be irrigated is not constant. The uniformity of the water distribution accordingly suffers due to the changes that occur in the effective overall length of the irrigation system as the ancillary span extends out and then retracts back in. Stated differently, when the ancillary span is in its most retracted orientation with respect to the primary irrigation pipeline, a substantial length of the ancillary span may pass over the same point on the ground below the ancillary span. Conversely, when the ancillary span is at its most extended orientation, only the width of the pipeline may pass over a point on the ground. Accordingly, in order to distribute water evenly, it is necessary to supply water to the machine at varying rates (because more water is required when the machine is operating at its maximum length than when it is at minimum length) or to activate and deactivate select sprinklers to control the amount of water being distributed from particular portions of the primary irrigation pipeline and/or the ancillary span at various times throughout the irrigation cycle.

Various solutions designed to improve the uniformity and optimal distribution of water resources have been proposed. One such solution adjusts water distribution via one or more mechanical switches, known as a cam switches, which allow for a set of sprinkler groupings to activate during phases of the irrigation cycle when the ancillary span is extending or extended and a separate set of sprinkler groupings to activate during phases of the irrigation cycle when the ancillary span is retracting or retracted. This solution does not predict the maneuvers (e.g., extension, retraction and/or velocity) of an ancillary span but rather reacts to the ancillary span maneuvers through a hinge mechanism such that when the ancillary span is at a particular extension angle relative to the primary irrigation pipeline, a switch is activated or deactivated and, based on the configuration it controls, the corresponding grouping of sprinklers is likewise activated or deactivated.

Other solutions designed to improve the uniformity and optimal distribution of water resources using the extension angle of the ancillary span relative to the primary irrigation pipeline as a means of controlling activation and deactivation of sprinkler groupings utilize a programmable logic controller (PLC). A PLC is used in lieu of a cam switch but has a similar effect. An irrigation system incorporating a PLC is able to control many more sprinkler groupings than a mechanical cam switch through the use of a programmable routine.

Yet other solutions designed to improve the uniformity and optimal distribution of water resources utilize time-based activation and deactivation of groupings of sprinklers. These solutions effectively divide the operation of an irrigation system incorporating an ancillary span into successive, time-based operating cycles. Groupings of sprinklers are then activated or deactivated in accordance with the position of the ancillary span at each operating cycle. Still other solutions provide for the operation of various sprinkler groupings based upon the size of the surface area traversed during operation of the irrigation system.

SUMMARY

This Summary is provided to introduce a selection of concepts in a simplified form that are further described below in the Detailed Description. This Summary is not intended to identify key features or essential features of the claimed subject matter, nor is it intended to be used in isolation as an aid in determining the scope of the claimed subject matter.

Aspects of the disclosure provide systems and methods for determining optimal water capacity or distribution for each of a plurality of sections of a field-of-interest to be irrigated by an ancillary span, wrap span, or the like of an irrigation system. The disclosed systems and methods utilize a path determined for a steering tower of an ancillary span that is comprised of a plurality of position-based coordinates. Knowledge of the position of the ancillary span steering tower (and thus the position of the ancillary span) relative to the determined path permits optimal water capacity or distribution for sections of the field-of-interest corresponding to the location of the steering tower at any given point throughout the irrigation cycle, such optimal water capacity or distribution being based upon a calculated area factor.

A path of travel is determined for the steering tower of the ancillary span. The area under the ancillary span is highly variable due to the number of maneuvers that can be taken by the ancillary span. That is, during normal operations, the ancillary span can extend, retract and travel at increased or decreased velocities relative to the primary irrigation pipeline, even though it is coupled with the primary irrigation pipeline. The path of travel for the ancillary span steering tower is determined based upon the distance of the steering tower from the central pivot point and the angle of the ancillary span steering tower relative to the primary irrigation pipeline. Utilizing these two factors, a plurality of sectors and a plurality of zones may be defined within the area of the field-of-interest to be irrigated by the ancillary span. The result is a plurality of defined sections, or areas, each within a zone and a sector.

The area of each section is calculated, for instance, utilizing the shoelace algorithm attributed to Gauss, such algorithm being known to those having ordinary skill in the art, or a method similar thereto. The section having the largest area within each zone (i.e., the "prime section") is used to determine maximum water capacity or demand required within the zone. Thus, by definition, the prime section within each zone will require the largest water demand. Sprinkler nozzle sizes for each zone on the ancillary span are selected to satisfy the water demand for the prime section. To avoid over-watering sections within the zone having smaller areas, area factors are determined by dividing the area of each other section within the zone by the area of the prime section. In this way, the water distribution within each section of a zone may be adjusted in accordance with its area factor, preventing overwatering of sections having smaller areas.

BRIEF DESCRIPTION OF THE DRAWINGS

Aspects of the disclosure are described in detail below with reference to the attached drawing figures, wherein:

FIG. 9 illustrates an exemplary area factor chart in accordance with aspects of the disclosure.

DETAILED DESCRIPTION

The subject matter of aspects of the present disclosure is described with specificity herein to meet statutory requirements. However, the description itself is not intended to limit the scope of this patent. Rather, the inventors have contemplated that the claimed subject matter also might be embodied in other ways, to include different components, steps, or combinations of components and/or steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

As previously set forth, in center pivot irrigation systems, spans comprising a primary irrigation pipeline travel in a fixed circular operation in relation to the center pivot point of the irrigation system of which the primary irrigation pipeline is a part. The path of travel is determined by the radial position of the span relative to the central pivot point. Since the span is a structural assembly and it operates in a constant and known circular path, the area of a field-of-interest capable of being irrigated by the span can be ascertained through standard mathematical calculations. And, when the area of the field-of-interest capable of being irrigated by the span is known, optimal water capacity is substantially uniform and can be readily determined. For an ancillary span, this process is more complex due to the ability of ancillary spans to maneuver at changing orientations and changing extension and retraction velocities independent of the primary irrigation pipeline. Through the use of a predetermined path, however, these maneuvers are predictable and optimal water capacity can be calculated using the methods described in the present disclosure.

Figure 1:
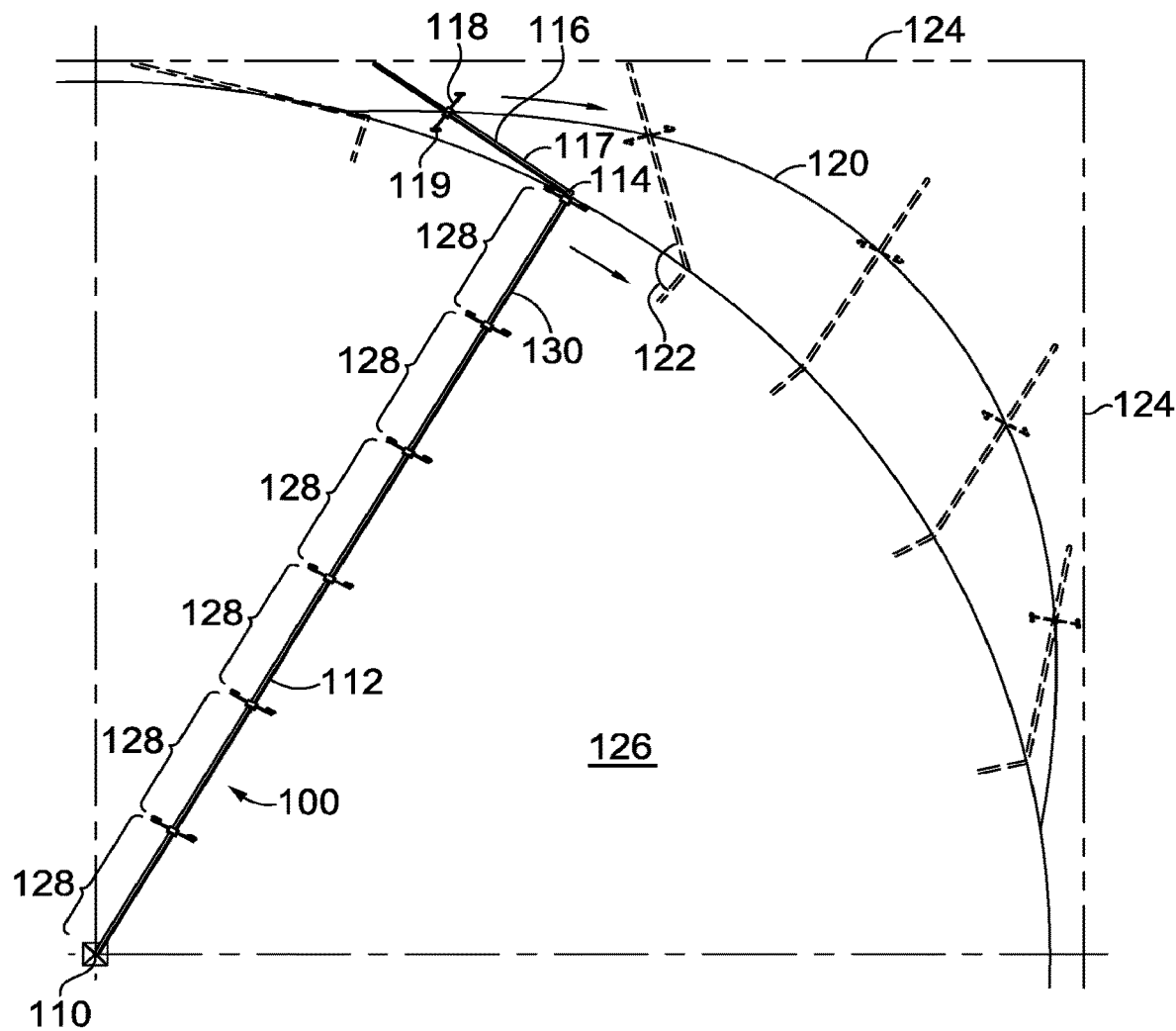
FIG. 1 is a schematic plan view of a center pivot irrigation system with an ancillary span operating in a corner of a field in accordance with an embodiment of the present disclosure.
Figure 2:
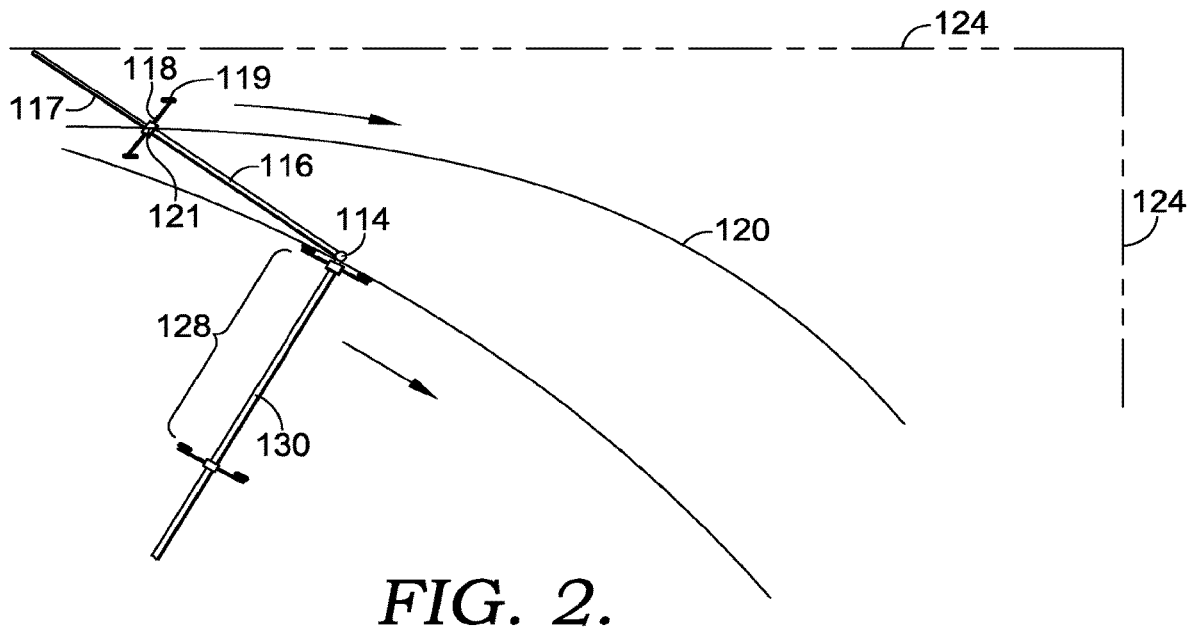
FIG. 2 is an enlarged fragmentary view of the irrigation system of FIG. 1 with the ancillary span in a first location where the ancillary span is just entering the corner and is almost completely trailing the primary irrigation pipeline.
Figure 3:
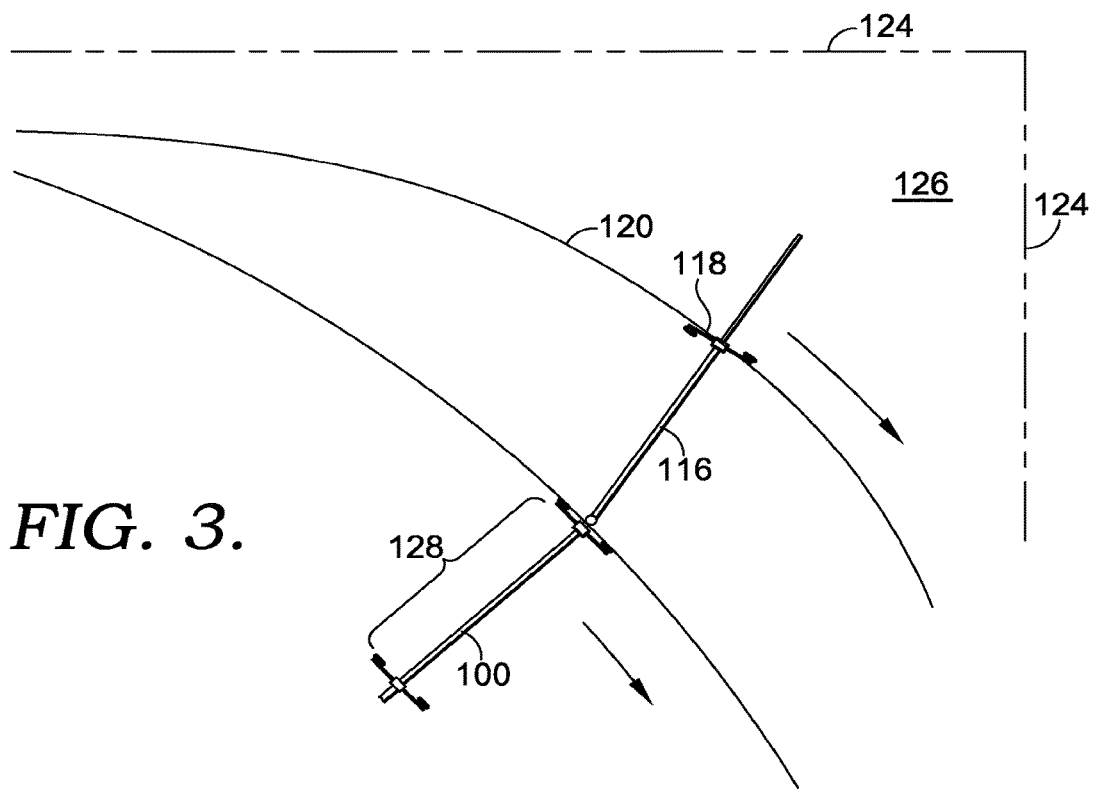
FIG. 3 is an enlarged fragmentary view of the irrigation system of FIG. 1 with the ancillary span in a second location where the ancillary span is at an almost fully extended position with respect to the primary irrigation pipeline.

Aspects of the disclosure provide systems and methods for determining optimal water capacity or distribution for each of a plurality of sections of a field-of-interest that are to be irrigated by an ancillary span of an irrigation system. With reference to the schematic illustrations of FIGS. 1-3, an irrigation system 100 suitable for performing methods in accordance with embodiments hereof includes a central pivot point 110, about which a primary irrigation pipeline 112 swivels, and a hinge point 114, at which an ancillary span 116 is coupled with a distal end of the primary irrigation pipeline 112. Irrigation systems suitable for performing methods in accordance with embodiments hereof further include a steering tower 118 positioned along the length of the ancillary span 116 at a distance spaced from the hinge point 114. The steering tower 118 of the ancillary span 116 is controllable independently of the central pivot point 110 and/or the primary irrigation pipeline 112. In embodiments, the steering tower 118 includes one or more motors (not shown) and electronic components (not shown) suitable for controlling movement of the ancillary span 116.

The disclosed systems and methods utilize a path of travel 120 determined for the ancillary span steering tower 118. (It is noted that in FIGS. 1-3, only a portion of the path of travel 120 is depicted. This is in no way meant to limit embodiments of the present disclosure.) The area capable of being irrigated by the ancillary span 116 is highly variable due to the number of maneuvers that can be performed by the ancillary span 116. That is, during normal operations, the ancillary span 116 can extend and retract as well as travel at increased and decreased velocities relative to the primary irrigation pipeline 112, even though it is coupled with the primary irrigation pipeline 112 at the hinge point 114. The path of travel 120 for the ancillary span steering tower 118 comprises a file that includes a plurality of polar coordinates that are referenced from the central pivot point 110. In some embodiments, the path of travel includes 3,600 polar coordinates for a full rotation of the irrigation system.

It should be noted that in the illustrated embodiment and the discussion described herein, the orientation of the steering tower 118 with respect to the pipeline 117 of the ancillary span 116 is fixed and the wheels 119 of the steering tower 118 rotate with respect to the steering tower 118. Consequently, the wheels 119 of the steering tower 118 do not follow in the same path nor do they follow along the path of travel 120, as described herein or illustrated. Instead, the path of travel 120 is the imaginary path along the ground above which a reference point 121 of the steering tower 118 travels. In the illustrated embodiment, the reference point 121 is the center point where the steering tower 118 connects to the ancillary span 116. The location of the reference point 121 relative to the steering tower 118, however, can vary based upon the application. Thus, it is within the scope of embodiments of the present disclosure to have a reference point, or guidance system, anywhere on or about the steering tower 118 (e.g., on a leg of the steering tower 118, proximate to the center of the steering tower 118, on a bracket coupled with the steering tower, or the like). It is further within the scope of embodiments of the present disclosure to have a steering tower where the orientation between the wheels of the steering tower and the steering tower itself is fixed (e.g., like it is on a tower under the principle span of the parent system) and the orientation of the steering tower with respect to the pipeline 117 of the ancillary span 116 is variable (i.e., where the steering tower rotates with respect to the ancillary span). In such an arrangement, the wheels of the ancillary tower could ride in a single path, thereby minimizing crop damage, and the single path could actually be along the path of travel.

In illustrative embodiments, to determine the path of travel 120 for the ancillary span steering tower 118, the distance of the reference point 121 (the center point in the illustrated embodiment) of the steering tower 118 from the central pivot point 110 and the angle 122 of the ancillary span 116 relative to the primary irrigation pipeline 112 may be determined. To determine these two factors, the boundary 124 (i.e., physical borders) of the field-of-interest 126 is determined. (It is noted that in FIGS. 1-3, only a portion of the boundary 124 and of the field-of-interest 126 is illustrated. This is in no way meant to limit embodiments of the present disclosure.)

In some embodiments, the boundary 124 of the field-of-interest 126 may be determined by geospatial mapping. In some embodiments, geospatial mapping is accomplished through the use of global positioning systems (GPSs) with the output being a file containing coordinates. These coordinates define the boundary 124 of the field-of-interest 126. In some embodiments, a GPS sensor or other suitable geospatial mapping apparatus (not shown) is coupled with the ancillary span steering tower 118. The sensor or other suitable apparatus may be communicatively coupled with one or more computing devices (e.g., servers and/or databases) configured for receiving, interpreting, and storing sensed geospatial data.

It will be understood and appreciated by those having ordinary skill in the art that other methods of capturing the field-of-interest may be utilized. Reference to the illustrative embodiments herein is not meant to limit the scope of embodiments of the present disclosure in any way. Any number of field-of-interest-capturing variations, and any combination thereof, are contemplated to be within the scope of embodiments of the present disclosure.

With the boundary 124 known, the irrigation system is fitted to optimize the area within the mapped boundary that is capable of being irrigated by the primary irrigation pipeline 112. As a result of this optimization process, an optimal location for the central pivot point 110 of the irrigation system is determined. The central pivot point 110 provides the point at which all spans 128 of the primary irrigation pipeline 112, typical and non-typical, are attached through linking the spans 128 together. The spans 128 swivel as a single unit around the central pivot point 110. This causes the spans 128 to travel in a circular operation, representing a circle upon completion of a full operation. During the optimization process and determination of the location of the central pivot point 110, spans 128 are selected to fit within the boundary. The "last span" 130 of the primary irrigation pipeline 112 is the final span in the link of one or more typical spans comprising the primary irrigation pipeline 112.

Utilizing the combination of the field-of-interest boundary 124 and the last span 130 as constraints, an optimal ancillary span 116 is selected such that the ancillary span 116 is capable of irrigating as large an area outside the area covered by the primary irrigation pipeline 112 as possible. The selected ancillary span 116 is coupled with the primary irrigation pipeline 112 at the hinge point 114 located at a distal end of the last span 130 to provide additional coverage in the corners due to the ability of the ancillary span 116 to extend and retract in and out of the field corners and/or around other obstacles through the use of the independently controlled ancillary span steering tower 118.

Figure 4:
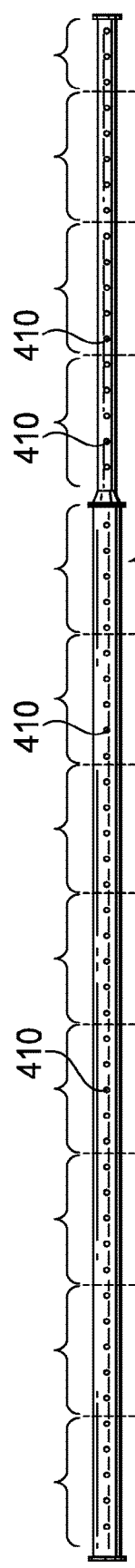
FIG. 4 is a top plan view of a top side of a pipeline of the ancillary span with a plurality of sprinkler outlets thereon, each sprinkler outlet illustrated in an open position in accordance with an embodiment of the present disclosure.
Figure 5:
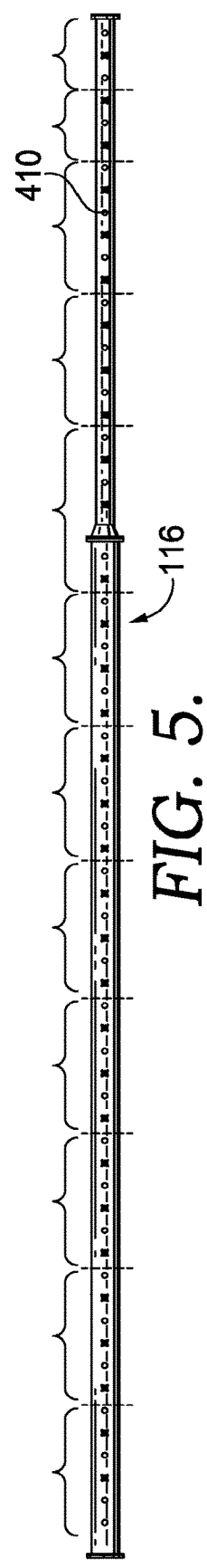
FIG. 5 is the pipeline of FIG. 4 with some of the sprinkler outlets illustrated in a closed position in accordance with aspects of the present disclosure.
Figure 6:
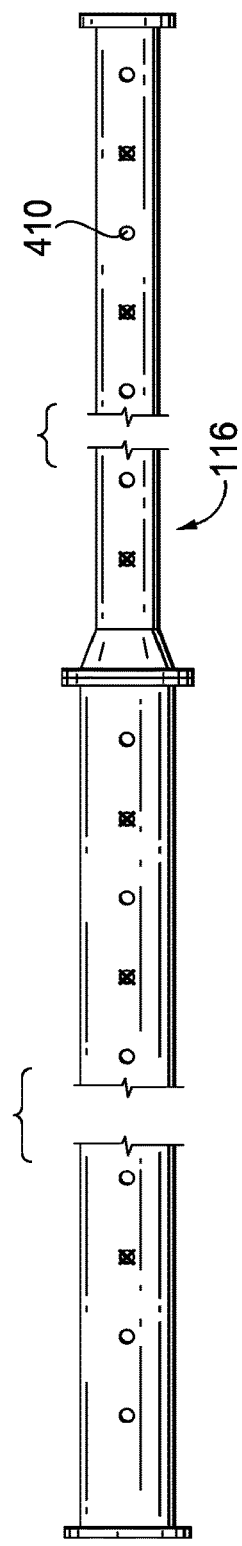
FIG. 6 is an enlarged, fragmentary view of the pipeline of FIG. 5.

The selected ancillary span 116 is further optimized by the arrangement of sprinkler nozzles 410 along the length thereof. The sprinkler nozzles 410 are connected to the ancillary span 116 at sprinkler outlets positioned longitudinally along the ancillary span 116. Various arrangements can be seen with reference to the schematic diagrams of FIGS. 4-6. It will be understood and appreciated by those having ordinary skill in the art that different lengths of ancillary spans 116 may be available and/or may become available in the future. As such, the illustrated embodiments are not exhaustive of all possible zone and sprinkler nozzle arrangements but rather are merely illustrative for the purposes of the present disclosure. A plurality of zones and a plurality of sprinkler nozzles may be present on any given ancillary span 116.

In accordance with embodiments of the present disclosure, the sprinkler nozzles 410 are progressively arranged into zones (more fully described below) located linearly and longitudinally along the ancillary span 116. In many prior art systems (not shown), the sprinkler nozzles were arranged in what could have been considered a random distribution method known as sprinkler groupings.

With reference back to FIGS. 1-3, the result of the optimization of the ancillary span 116 is a path of travel 120 based on the location of the ancillary span steering tower 118 relative to the central pivot point 110 and the angle 122 at the hinge point 114 of the ancillary span 116 relative to the parent system or primary irrigation pipeline 112. The path of travel 120 of the ancillary span steering tower 118 is determined by the maneuvers required to optimize coverage within the constraints of the field-of-interest boundary 124 and the last span 130. These maneuvers are recorded within a file referred to herein as the "path.dat" which contains, by way of example only, 3,600 polar coordinates correlating the central pivot point 110 to the location of a positioning system (not shown) corresponding to the ancillary span steering tower 118. In embodiments, the ancillary span steering tower positioning system is coupled with the ancillary span steering tower 118 itself.

Figure 7:
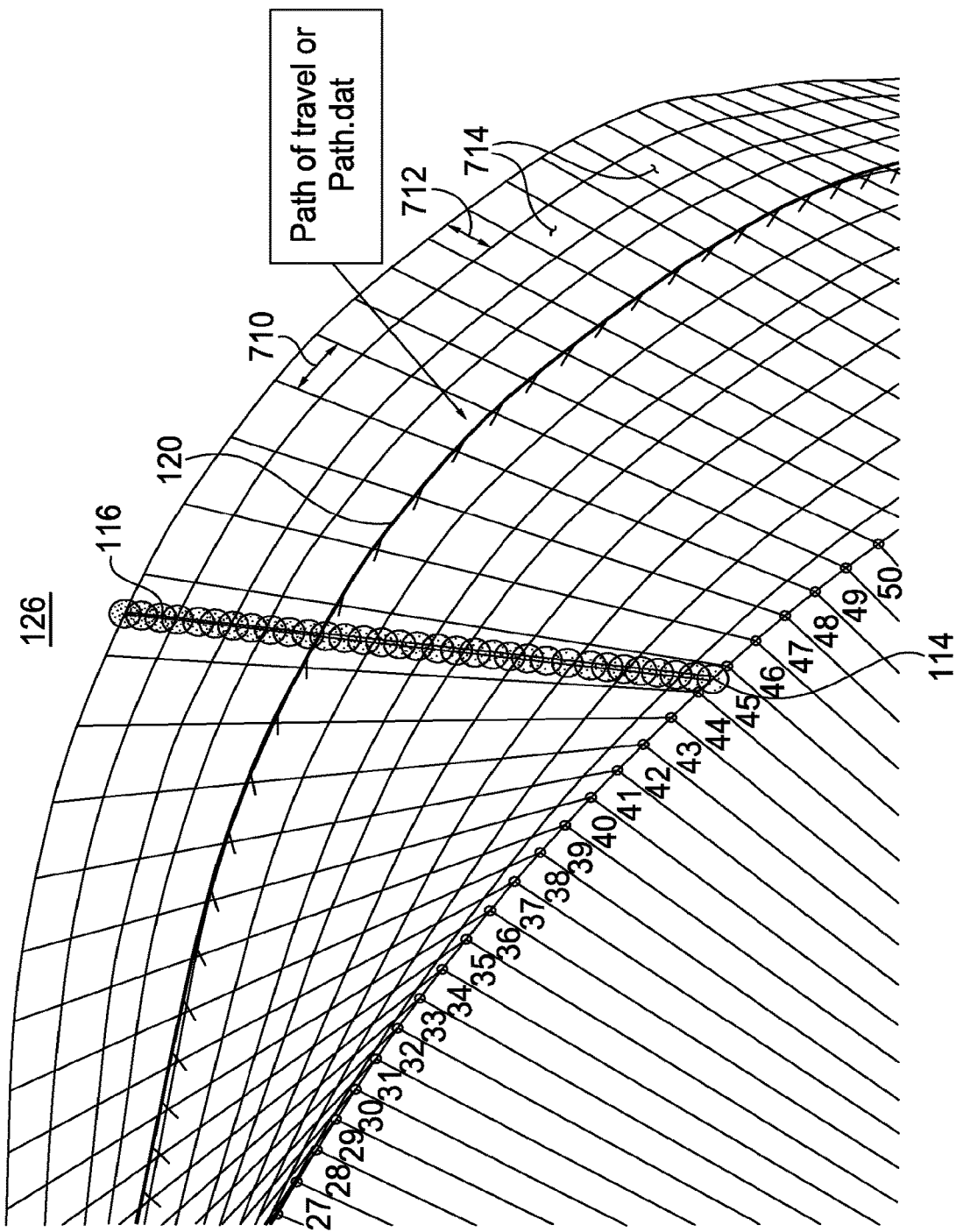
FIG. 7 is a schematic view of a portion of an area to be irrigated in accordance with an embodiment of the present disclosure.

Turning now to FIG. 7, a plurality of sectors 710 and a plurality of zones 712 within a portion of the field-of-interest 126 that is to be irrigated by the ancillary span are defined, the portion of the field-of-interest 126 corresponding to the path of travel 120. A "sector" 710, as the term is utilized herein, is a defined area containing a beginning angle and an ending angle corresponding to the central pivot point 110 of the irrigation system 100. For instance, a sector 710 may begin at an angle of 30 degrees relative to the central pivot point 110 and end at an angle of 30.1 degrees relative to the central pivot point 110. In this way, sectors 710 extend from the central pivot point to the field boundary. For purposes of the present disclosure, particular interest is taken of the portion of each sector that is to be irrigated by the ancillary span 116.

A "zone" 712, as the term is utilized herein, is a defined area containing a beginning distance or radius and an ending distance or radius, each distance/radius being determined based upon a distance from the central pivot point 110 of the irrigation system 100. For instance, a zone 712 may begin at 451 feet from the central pivot point 110 and end at 523 feet from the central pivot point 110. Zones 712 defined by distances closer to the central pivot point will be entirely contained within the boundary of the field and will have a circular outer perimeter. Zones 712 defined by distances further from the central pivot point will have an arcuate portion but the boundary of the field may prevent the zone from having a fully circular outer perimeter. For purposes of the present disclosure, particular interest is taken of those zones that are to be at least partially irrigated by the ancillary span 116. Zones 712 that are to be fully or partially irrigated by the ancillary span 116 may be defined similarly to the above-description, however, the distances from the central pivot point 110 that define the zones 712 will vary based upon sector 710.

Figure 8:
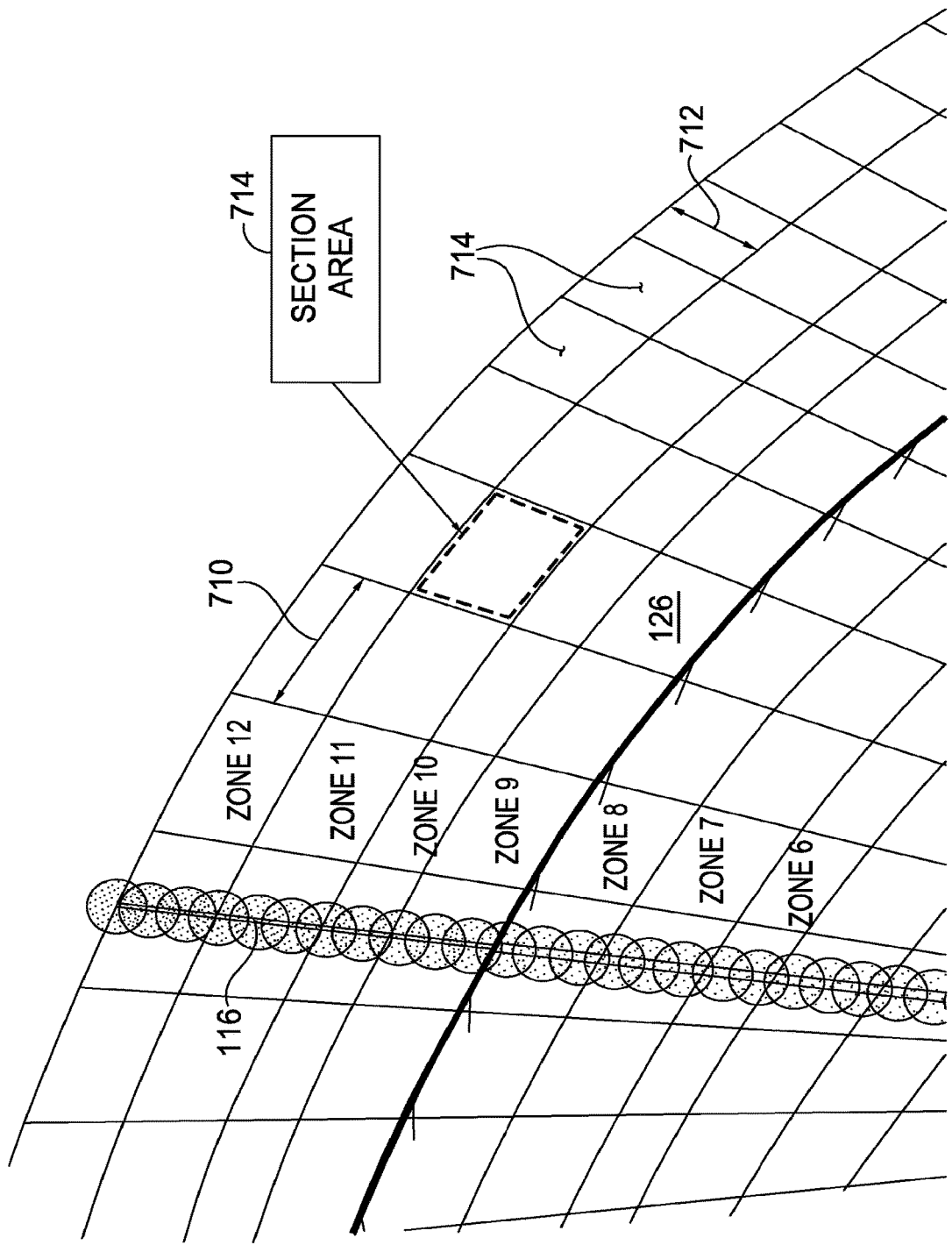
FIG. 8 is an enlarged view of a portion of FIG. 7.

Based upon the defined sectors 710 and zones 712, a plurality of sections 714 is defined within the portion of the field-of-interest 126 to be irrigated by the ancillary span 116. An exemplary section 714 is shown with reference to FIG. 8. Each section 714 exists within a corresponding zone 712 and sector 710. Each section 714 is defined by determining the angle 122 of the ancillary span 116 at the hinge point 114 relative to the parent system or primary irrigation pipeline 112 and determining a distance between the steering tower 118 of the ancillary span 116 and the central pivot point 110 at each coordinate location along the path of travel 120. Each section 714 is defined by a resultant sector 710 and zone 712 in which the steering tower 118 of the ancillary span 116 is located at each coordinate location along the path of travel 120, the steering tower 118 location being based upon the determined angle 122 of the ancillary span 116 at the hinge point 114 relative to the parent system or primary irrigation pipeline 112 and the determined distance between the steering tower 118 and the central pivot point 110. While the perimeter of each section 714 generally will form a polygon, the area of each section 714 can vary based upon the zone 712 and sector 710 defining its location.

To optimize water capacity for each section 714, the area of each section 714 is determined. In embodiments, the shoelace algorithm attributed to Gauss, as known to those having ordinary skill in the art, (or a similar method) is utilized to determine the area within each polygonal section 714. The section 714 having the largest area within each zone 712 (i.e., the "prime section") is used to determine maximum water capacity or demand required within the zone 712. Thus, by definition, the prime section within each zone 712 will require the largest water demand. Where there are multiple zones 712 within the portion of the field-of-interest 126 to be watered by the ancillary span 116, multiple prime sections will result. There can, however, only be one prime section per zone 712. In the event there is more than one section 714 within a zone 712 that have identical areas that are the largest areas in the zone 710, only one is selected to be the prime section. However, as more fully described below, the other equivalent-area section(s) 714 would also receive 100% water capacity. All other sections 714 within the zone 712 have an area less than the area of the prime section and, accordingly, variations in water capacity for those smaller area zones 712 is required. For instance, in some embodiments, there may be multiple sectors 710 within the field-of-interest 126 having widths of varying degrees (e.g., one sector width may be 10 degrees and another sector width may be 3 degrees when measured at the hinge point 114). In such embodiments, area factor percentages may be determined by dividing the area of each of the sections by the width of their corresponding sector 710 when measured at the hinge point 114. The prime section is then defined by the greatest magnitude of this quotient, not the original area.

Area factor percentages then may be determined by dividing the area of each section (or area of a section divided by the width of its sector, as appropriate) by the area of the prime section. An exemplary chart showing various area factor percentages based upon section area is illustrated in FIG. 9.

Sprinkler nozzle sizes for the ancillary span 116 are selected to satisfy the water demand for the prime section. However, if these sprinklers were to continue to operate at maximum capacity within other sections 714 throughout the zone 712, intense over-watering or oversupply of water to those sections 714 could occur. To avoid over-watering sections 714 within the zones 712 having smaller areas, area factors are determined by dividing the area of each other section 714 within the zone 712 by the area of the prime section. In this way, the water distribution within each section 714 of a zone 712 may be adjusted in accordance with its area factor, preventing overwatering of sections 714 having smaller areas.

In the illustrated embodiment of the present disclosure the area factor controls the running time of sprinkler nozzles 410 along the length of the ancillary span 116 based on the area factor percentage. For example, if the ancillary span 116 had a run time of three minutes to cross a particular section 714, the sprinklers positioned to correspond to a section 714 having an area factor percentage of 100% would be turned on for all three minutes, whereas the sprinklers corresponding to a section 714 having area factor percentage of 50% would be turned on for ninety seconds and turned off for ninety seconds. The prime section and sections with an area equal to the prime section are the only sections 714 where the sprinklers will be turned on for 100% of the time period. In all other sections 714 the sprinklers are turned off for some period of time as the ancillary span 116 crosses that section 714.

While the volume of water applied to sections 714 other than a prime section and sections equal to the prime section is controlled in the embodiment described above by turning sprinklers in a particular zone 712 off for a time period to reduce the amount of water applied to the smaller area sections (i.e., a binary, on-off water control method), other methods of reducing the volume of water applied to the section 714 may be used and still be within the scope of embodiments of the disclosure. For example, a variable volume method may be used, whereby the sprinklers are throttled down to reduce the volume of water dispensed therefrom to match the area factor percentage for that section 714. Such a method would require being able to independently control either the volume of water delivered to each sprinkler or the volume of water each sprinkler may dispense, either of which may increase complexity and cost. Additionally, reducing the volume of water applied to a sprinkler head may have the undesired effect of reducing its area of coverage. In yet a further alternate embodiment only certain sprinklers within each zone may be turned off for certain period of time to achieve the proper volume of water applied to a section based on its area factor percentage. Again, such a method may increase complexity and cost. For these reasons the binary/on-off method describe initially above may be found to be beneficial in some applications.

Figure 10:
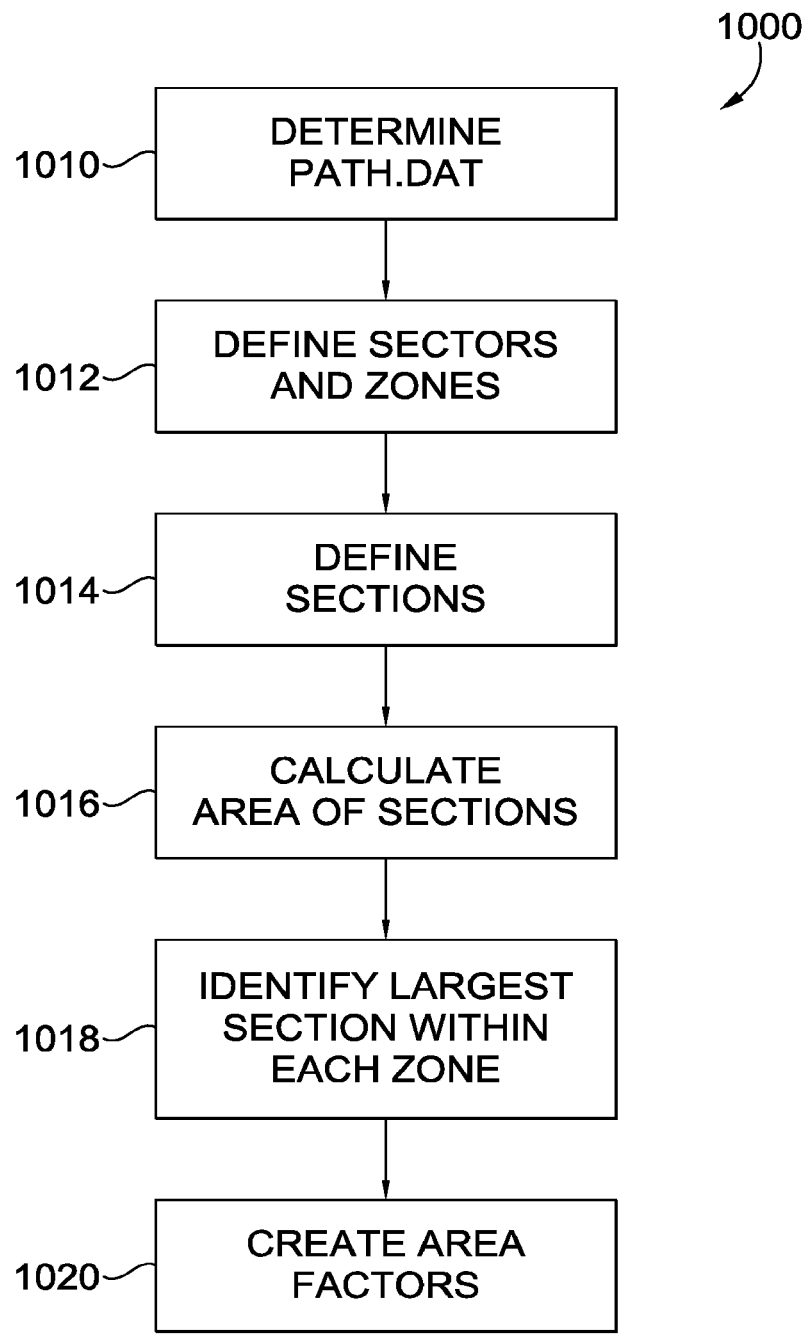
FIG. 10 is a flow diagram of a method of determining optimal water capacity for portions of a field-of-interest to be irrigated by an ancillary span of an irrigation system in accordance with an embodiment of the disclosure.

With reference now to FIG. 10, an exemplary method for determining optimal water capacity for portions of a field-of-interest 126 to be irrigated by an ancillary span 116 of an irrigation system 100 is shown. The irrigation system 100 has a central pivot point 110 about which a primary irrigation pipeline 112 swivels and has a hinge point 114 at which the ancillary span 116 is coupled with the primary irrigation pipeline 112. Initially, as illustrated at block 1010, a path of travel 120 is determined for the steering tower 118 of the ancillary span 116. As illustrated at block 1012, a plurality of sectors 710 and a plurality of zones 712 within a portion of the field 126 to be irrigated by the ancillary span 116 are defined. The portion of the field-of-interest 126 corresponds to the path of travel 120.

As illustrated at block 1014, a plurality of sections 714 within the portion of the field-of-interest 126 to be irrigated by the ancillary span 116 is defined, each of the plurality of sections 714 corresponding to one of the plurality of sectors 710 and one of the plurality of zones 714. As illustrated at block 1016, an area of each of the plurality of sections 714 is calculated. As illustrated at block 1018, a section 714 in each of the plurality of zones 712 that has an area of the largest magnitude is identified.

As illustrated at block 1020, an area factor for each section 714 of the plurality of sections 714 is calculated based, at least in part, upon the area of the largest magnitude identified for the one of the plurality of zones 712 that corresponds to each section 714. Based upon the area factor, optimal water capacity or distribution to each section 714 is determined.

Additionally, although some exemplary implementations of the embodiments described herein are shown in the accompanying figures, these implementations are not intended to be limiting. Rather, it should be understood that the various embodiments and aspects described herein may be implemented upon any number of irrigation systems. It is within the scope of the present disclosure that the above principals could be equally applied in other settings.

Many different arrangements of the various components depicted, as well as components not shown, are possible without departing from the spirit and scope of the present disclosure. Embodiments of the present disclosure have been described with the intent to be illustrative rather than restrictive. Alternative embodiments will become apparent to those skilled in the art that do not depart from its scope. A skilled artisan may develop alternative means of implementing the aforementioned improvements without departing from the scope of the present disclosure.

Aspects of the disclosure have been described to be illustrative rather than restrictive. It will be understood that certain features and sub-combinations are of utility and may be employed without reference to other features and sub-combinations. This is contemplated by and is within the scope of the claims.

What is claimed is:

1. A method for determining a path of travel for a steering tower of an ancillary span of an irrigation system, the irrigation system having a central pivot point about which a primary irrigation pipeline swivels and having a hinge point at which the ancillary span is coupled with the primary irrigation pipeline, the method comprising:
defining a boundary of a field-of-interest;
based, at least in part, on the defined boundary, determining optimal placement of the central pivot point so as to maximize a portion of the field-of-interest capable of being irrigated by the primary irrigation pipeline;
based, at least in part, on the defined boundary and the determined optimal placement of the central pivot point, selecting one or more spans for the primary irrigation pipeline;
based, at least in part, on the defined boundary and a location, relative to the central pivot point, of an outer end point of a last span of the primary irrigation pipeline, selecting the ancillary span for coupling with the primary irrigation pipeline at the hinge point so as to optimize water capacity for portions of the field-of-interest that are not capable of being irrigated by the primary irrigation pipeline; and
determining the path of travel for the steering tower of the ancillary span based, at least in part, on the selected ancillary span and a location of the steering tower relative to a length of the ancillary span;
wherein a portion of the ancillary span comprises one or more sprinkler nozzles, and wherein water capacity for at least a portion of the one or more sprinkler nozzles is adjusted based upon the path of travel.

2. The method of claim 1, wherein the boundary of interest is defined via geospatial mapping.

3. The method of claim 2, wherein defining the boundary of the field-of interest via geospatial mapping comprises defining the boundary of the field-of-interest utilizing a global positioning system that outputs a file containing a plurality of coordinates that correspond to the boundary of the field-of-interest.

4. The method of claim 2, wherein the path of travel for the steering tower of the ancillary span comprises a file containing a plurality of polar coordinates that correlate the location of the steering tower to the central pivot point as the steering tower traverses the path of travel.

5. The method of claim 1, wherein the steering tower is rotatably coupled to the ancillary span.

6. The method of claim 5, wherein the steering tower comprises at least one wheel having an orientation that is fixed relative to the steering tower.

* * * * *